Figure 1:
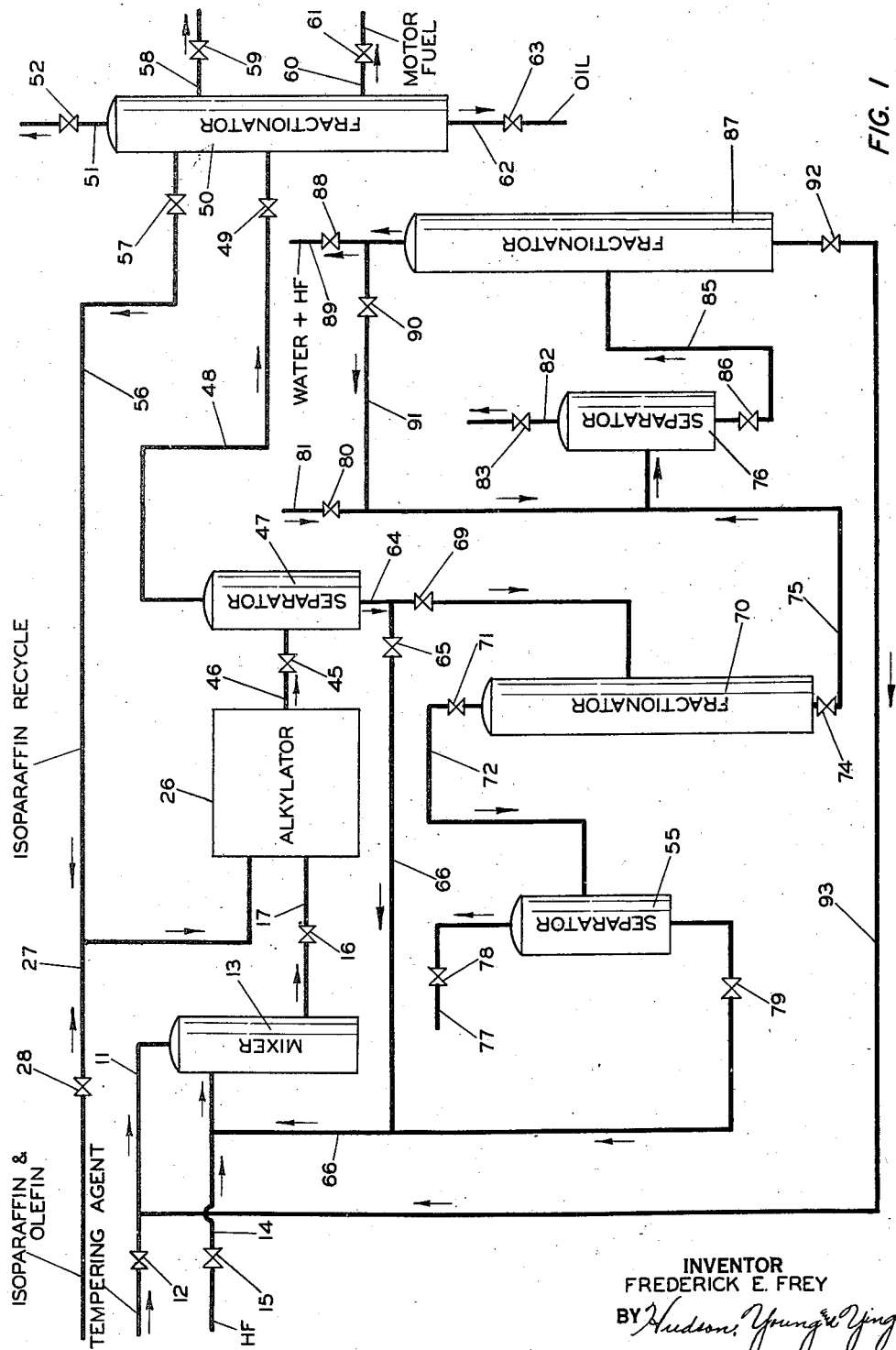

Patented Sept. 4, 1945

2,384,294

UNITED STATES PATENT OFFICE 2,384,294

PROCESS FOR CONVERTING HYDRO-
CARBONS

Frederick E. Frey, Bartlesville, Okla., assignor to
Phillips Petroleum Company, a corporation of
Delaware Application July 11, 1942, Serial No. 450,588

13 Claims. (Cl. 260—671)

This invention relates to the conversion of hydrocarbons. More particularly it relates to the use of catalysts, modified by the addition of suitable tempering agents, for effecting catalytic alkylation of alkylatable hydrocarbons, especially isoparaffinic and aromatic hydrocarbons.

In a typical method of conducting an alkylation reaction, an alkylatable hydrocarbon is agitated with substantially anhydrous hydrofluoric acid to produce a liquid mixture or emulsion which is maintained at a reaction temperature suitable for alkylation, and an alkylating reactant is introduced in such a way as to maintain only a very low concentration of alkylating reactant in the mixture. After a suitable reaction time the hydrocarbon layer may be decanted, and the juncture product or alkylate may be separated from the other hydrocarbons, as by fractional distillation. This reaction can be effected not only at temperatures requiring some degree of refrigeration, that is, below room temperature, as is the commercial practice when sulfuric acid is used as an alkylating catalyst, but also at temperatures equal to and above ordinary temperatures, whereby the need for refrigeration is avoided. Hydrogen fluoride lacks the oxidizing tendency which sulfuric acid possesses and which leads to the formation of sulfur dioxide and sludge compounds in serious degree when the latter catalyst is used for alkylation at elevated temperatures. The alkylation reaction is exceedingly rapid at the higher temperatures; for example, it can be virtually completed in less than three minutes at 125° F. when using butylenes and isobutane as reactants with hydrogen fluoride as the catalyst. At such an elevated reaction temperature, however, as compared with the result obtained at, for example, a temperature lower by 50° F., the actual and/or effective scission of the primary juncture product becomes quite marked, butylenes plus isobutane yielding, for example, not only iso-octane, which preponderates at the lower reaction temperature, but also considerable pentanes, hexanes, and heptanes. When, from the standpoint of volatility or antiknock quality, the primary juncture product is desired, this scission produces an undesirable loss in quality of the product.

In a modified hydrofluoric acid alkylation process, such as that disclosed in my copending application, Serial No. 429,962, filed February 7, 1942, olefins are absorbed from a hydrocarbon stream by liquid concentrated hydrofluoric acid, and the resulting mixture is used to alkylate a suitable alkylatable paraffin. Because of the tendency of olefins to polymerize in concentrated hydrofluoric acid, the temperature of the acid-olefin mixture must be relatively low, preferably below room temperature, and/or the period of time elapsing between the absorption step and the alkylation step must be very short, and/or the hydrofluoric acid-to-olefin ratio must be relatively high, for example, above 10:1.

An object of my invention is to increase the yield of primary products in a hydrofluoric acid alkylation process.

Another object is to inhibit the formation of low-boiling hydrocarbons in hydrofluoric acid alkylation products.

A further object is to reduce or eliminate the need for refrigeration in producing a product of given characteristics and quality.

A further object is to increase the stability of olefins in concentrated hydrofluoric acid, particularly against polymerization.

Another object is to decrease the rate of formation of acid-soluble materials, thereby reducing the load on acid-rerun equipment.

Still other objects and advantages of this invention will be apparent from the following description, the accompanying drawings, and/or the appended claims.

I have found that, in an alkylation process catalyzed by hydrofluoric acid, certain agents may be advantageously added to the acid, to the reaction mixture, or to reactants in limited proportions to temper the activity of the catalyst and to inhibit deleterious side reactions. Further, I have found that olefins, when dissolved in hydrofluoric acid containing such a tempering agent, retain their usefulness as alkylating agents for longer times than when a tempering agent is not present. Still further, I have found that most of these agents may be advantageously recovered and recycled to the process.

In accordance with my invention I have found that the additive agents exerting this tempering effect are polar compounds which are preferentially soluble in the hydrofluoric acid phase of alkylation reaction mixtures and which have a definite or potential basicity or attraction for the hydrofluoric acid due to the presence in the molecule of the tempering agent of a basic nitrogen atom or a hydroxyl group as exemplified by the following types of compounds: (a) compounds containing a basic nitrogen atom such as ammonium compounds, amino, amido, imino, and imido compounds, the class of compounds being further exemplified by acid amides, such as acetamide, aliphatic amines, such as the butyl amines and ethylene diamine, and other aliphatic and cyclic nitrogen compounds including organic bases, such as quinoline, aniline, naphthylamines, toluidine, hexamethylene tetramine, pyridine, piperidine, toluylene diamine, inorganic ammonim compounds such as ammonium fluoride and the like may be used also; (b) hydroxylated organic compounds including aliphatic and aromatic alcohols such as methanol, ethanol, alcohol amines such as ethanolamine, phenol, catechol and other polyhydric phenols, and organic acids such as acetic, benzoic, tartaric, etc. Secondary or tertiary alcohols, while also operative, are not as desirable because of their tendency to form olefins by dehydration, however.

It will thus be seen that the compounds which may be utilized as tempering agents are those which are relatively basic to hydrofluoric acid and are selected from those which contain basic nitrogen atoms or hydroxyl groups.

The action of the tempering agents is not completely understood. However, it is believed that in general an additive agent, such as one of those mentioned above, lowers the surface tensions and interfacial tension in the reaction mixtures, and to some extent forms a loose chemical compound or molecular complex with one or more components of the reaction mixture, usually with hydrofluoric acid. A tempering agent, by lowering the interfacial tension between the acid and hydrocarbon phases in the reaction mixture, greatly increases the interfacial surface area which is obtainable by mechanical agitating devices, and thus facilitates the transfer of the alkylatable hydrocarbon into, and of the primary product out of, the acid phase. Most tempering agents also change the electrical conductivity and/or the dielectric constant of concentrated liquid hydrofluoric acid and therefore presumably affect the dissociating and/or ionizing power of the acid. Practically, the effect may be described as a reduction of the action of the acid on freshly formed primary alkylate and, in some instances, retardation of the rate of reaction of olefins in the acid, thereby reducing the extent of side reactions, such as polymerization and cyclization, and decreasing the formation of acid-soluble materials.

The tempering agents, such as have been described, may be dissolved in the hydrogen fluoride phase, and the alkylation of isoparaffin with an olefin or other alkylating reactant may then be conducted in any of the convenitional ways wherein the hydrocarbon reactants are brought into contact with the catalyst in the liquid state. Suitable concentrations of the tempering agents are usually in the range of about 0.1 to 10 per cent by weight of the acid, though in many instances this range may be exceeded without passing beyond the scope of this invention; the optimum concentration may be readily determined by trial in any particular instance.

Figure 2:
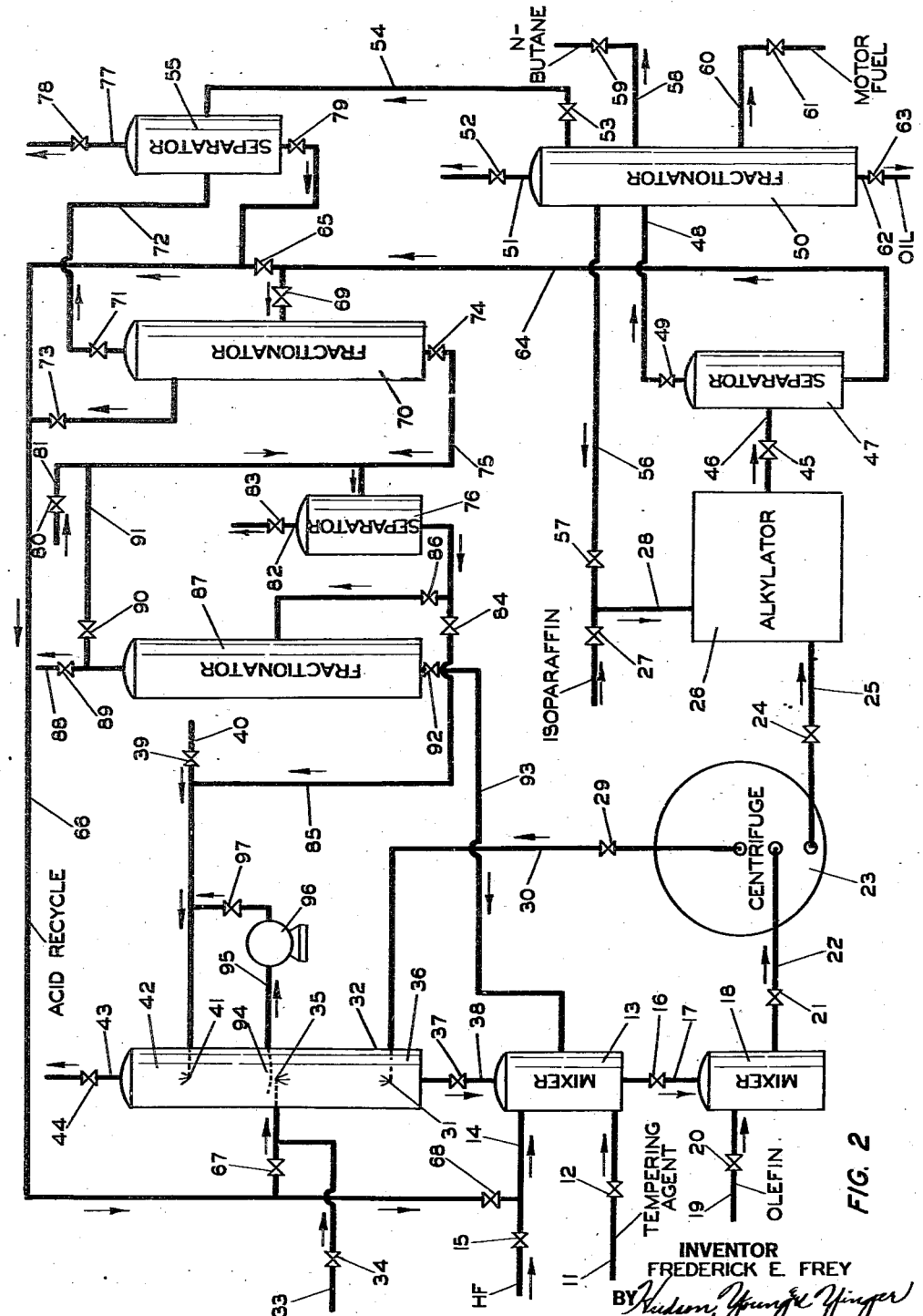

Understanding of my invention may be aided by the accompanying drawings in which Figure 1 is a schematic flow-diagram of one arrangement for practicing this invention in a hydrofluoric acid alkylation process, and Figure 2 is a schematic flow-diagram of an arrangement for practicing this invention in a modified process wherein olefins are first absorbed in concentrated hydrofluoric acid containing an addition agent and the resulting mixture is used to alkylate a suitable alkylatable hydrocarbon.

In Figure 1 a suitable addition or tempering agent, for example quinoline, aniline, or pyridine, is admitted to the system through inlet 11 having valve 12 to mixer 13, wherein it becomes dissolved in liquid concentrated hydrofluoric acid, which may be admitted through inlet 14 having valve 15. Mixer 13 may be very simple; usually simply injecting the modifying agent into a conduit which carries hydrofluoric acid will suffice as a means of mixing. The proportion of tempering agent may be from about 0.01 to about 20 per cent weight of the hydrofluoric acid. The optimum concentration depends upon the particular agent used and upon the operating conditions; usually it is in the range from about 0.1 to 10 per cent by weight of the hydrofluoric acid, and it may be readily determined by trial in any particular instance.

The effluent from mixer 13 passes through valve 16 and conduit 17 to alkylator 26, wherein it is agitated with a mixture of an alkylatable hydrocarbon and an alkylating reactant in suitable proportions. This mixture, which may be, for example, an isoparaffin, such as isobutane or isopentane, and an olefin, such as propylene or butylene, may be admitted through one or more inlets, such as inlet 27 controlled by valve 28. The alkylating conditions usually may be as follows: temperature, 50 to 200° F.; pressure, sufficient to maintain all components in the liquid phase; contact time or time of residence in alkylator 26, 1 to 30 minutes; vigorous agitation; and, preferably, maintenance of a large excess of the alkylatable hydrocarbon over the alkylating reactant.

The resulting mixture from alkylator 26 is passed through valve 45 and conduit 46 to separator 47, wherein it is separated into two liquid phases, as by cooling and/or gravitational or centrifugal means.

The lighter or hydrocarbon phase is passed through conduit 48 having valve 49 to fractionator 50, wherein it is separated into the following five fractions: (1) A very minor fraction comprising non-condensable gases, which may be withdrawn through outlet 51 having valve 52; (2) a fraction comprising low-boiling alkylatable saturated hydrocarbon material, which may be recycled via conduit 56 having valve 57 to alkylator 26; (3) a fraction comprising excess low-boiling alkylatable hydrocarbon and/or relatively difficultly alkylatable low-boiling hydrocarbons, which may be removed from the system through outlet 58 having valve 59; (4) a fraction comprising highly branched paraffinic hydrocarbons suitable for use in motor fuel, which may be withdrawn through outlet 60 having valve 61; and (5) a relatively small and high-boiling hydrocarbon fraction, which may be withdrawn through outlet 62 having valve 63.

The heavier or hydrofluoric acid phase from separator 47 may be recycled through valve 65 and conduit 66 to the acid inlet 14. Preferably, however, at least part of it is passed through valve 69 to acid fractionator 70, wherein it is separated into two fractions. An overhead fraction comprising substantially pure anhydrous hydrogen fluoride and lesser proportions of relatively low-boiling hydrocarbons is passed through valve 71 and conduit 72 to separator 55. A bottom fraction, which comprises mainly acid-soluble hydrocarbons, fluoro-organic material, hydrogen fluoride, some incidentally introduced water, and the tempering agent, is passed through valve 74 and conduit 75 to separator 76.

A stream of water is injected into conduit 75 through valve 80 and inlet 81 and is mixed therein with the acid sludge or residue from fractionator 70. The water extracts hydrogen fluoride and tempering agent from the acid sludge. The carbonaceous materials are substantially insoluble and separate out in separator 76 as an oily layer, which is removed through outlet 82 having valve 83.

The aqueous phase is passed from separator 76 through conduit 85 and valve 86 to a fractionator 87, wherefrom water and hydrogen fluoride are withdrawn overhead through valve 88 and outlet 89, and the recovered tempering agent is withdrawn as a bottom product in condition suitable for recycling to inlet 11, as through valve 92 and conduit 93. If desired, part or all of the aqueous overhead fraction from fractionator 87 may be recycled through valve 90 and conduit 91 to conduit 75 for re-use as extracting fluid.

The above-described flow-scheme is suitable for use with tempering agents or their compounds with hydrofluoric acid which are soluble in water or dilute aqueous hydrofluoric acid. This is true of many of the preferred agents; however, some may not fall within this category and hence may require different means of recovery for recycling. Relatively volatile tempering agents that do not form involatile compounds with hydrofluoric acid may be concentrated or recovered by fractional distillation. Relatively high-boiling tempering agents, such as some polyhydric phenols, which are insoluble in water or dilute aqueous hydrogen fluoride may be extracted by some other preferential solvent, such as an alkaline solution. Addition agents which are dissolved in the hydrocarbon phase or products may be recovered similarly by distillation or acid, alkali, or water extraction steps (not shown in the drawings), as will be obvious to those skilled in the arts of chemistry and chemical engineering. The most suitable modification for recovering and recycling the tempering agents will be apparent to those skilled in the art from the foregoing discussion, together with a consideration of the properties of the particular agent selected for use.

In Figure 2, a suitable addition or tempering agent, for example, quinoline, aniline, or pyridine, is admitted to the system through inlet 11 and valve 12 to mixer 13, wherein it becomes dissolved in a liquid concentrated hydrofluoric acid phase which may be admitted through inlet 14 having valve 15. The proportion of tempering agent in the hydrofluoric acid may be from about 0.01 to 20 per cent by weight of the acid. The optimum concentration depends upon the particular reagent used and upon the operating conditions; usually it is in the range from about 0.1 to 10 per cent by weight of the hydrofluoric acid; it may be readily determined by trial in any particular instance.

The effluent from mixer 13 passes through valve 16 and conduit 17 to a second mixer 18, into which is admitted, through inlet 19 and valve 20, a liquid or liquefied hydrocarbon stream which contains olefins. The olefins are preferably present in proportions of 1 to 50 per cent or more by weight of the hydrocarbon and are of the type suitable for use as alkylating agents, for example, propylene, butylenes, and/or amylenes. The olefins are rapidly absorbed in mixer 18 by the hydrofluoric acid phase, and the resulting mixture is passed through valve 21 and conduit 22 to centrifuge 23 wherein it is separated into an olefin-in-acid phase and a saturated-hydrocarbon phase.

The conditions in mixer 18 and centrifuge 23 are preferably as follows: temperature, 50 to 200° F.; pressure, sufficient to maintain all components in the liquid phase; total contact time, 5 seconds to 15 minutes or more; acid-to-olefin ratio, 5:1 to 20:1 by weight. These conditions are considerably less limited than those which I prefer to use when no inhibitor is present in the acid phase. For example, if no inhibitor is used, the preferred conditions are: temperature, 30 to 150° F.; acid-to-olefin ratio 10:1 to 50:1 by weight or more. Broadening of the range of operating conditions and advantageously operating under what formerly were the less favorable conditions, especially of the temperature and the acid-olefin ratio is possible in the process of this invention because the addition agent markedly lowers the tendency of the olefinc material dissolved in hydrofluoric acid to undergo polymerization and/or other side reactions which adversely affect its utility as an alkylating catalyst.

The olefin-in-acid phase from centrifuge 23 is passed through valve 24 and conduit 25 to alkylator 26, in which it is agitated under alkylating conditions with an alkylatable hydrocarbon, such as isobutane or isopentane, which may be introduced through valve 27 and conduit 28. Preferably, the proportion of alkylatable hydrocarbon to olefin is from 2:1 to 15:1 by weight. The alkylating conditions are preferably as follows: temperature, 75 to 200° F.; pressure, sufficient to maintain all components in the liquid phase; time, 1 to 30 minutes. Here again the operating conditions may be less favorable or less closely controlled for producing a product of given quality and yield than when no tempering agent is used; for example, if no addition agent is used, the corresponding preferred temperature range is from about 30 to 150° F. The tempering agent apparently reduces both the extent of side reactions and the tendency of the primary alkylation product to undergo secondary or reconstruction reactions.

The olefin-depleted hydrocarbon phase from centrifuge 23 passes through valve 29 and conduit 30 to a distributing means 31 in washer or absorber 32. The hydrocarbon rises, by virtue of its relatively low density, countercurrently to downwardly flowing hydrofluoric acid which may be introduced as the concentrated or anhydrous acid near the middle of the absorber through inlet 33, valve 34, and distributing means 35. Dissolved organic fluorides are absorbed from the hydrocarbon phase by the hydrofluoric acid, which, after a short settling period in space 36 at the bottom of the washer is passed through valve 37 and conduit 38 for addition of tempering agent and for subsequent use as olefin-absorbing liquid in mixer 18. Although as the hydrocarbon rises through the bottom half of absorber 32, the countercurrently flowing concentrated hydrofluoric acid extracts organic fluorides, appreciable quantities of hydrofluoric acid remain dissolved in the hydrocarbon. The hydrocarbon continues rising in the upper half of the absorber, wherein it is contacted with a countercurrently flowing aqueous phase, introduced as water or as a dilute solution of hydrofluoric acid of up to about 40 per cent in strength, preferably a constant-boiling mixture, through valve 39, inlet 40, and distributing means 41. The water or solution extracts the dissolved hydrofluoric acid from the hydrocarbon phase. If desired, part or all of the aqueous acid introduced near the top of absorber 32 may be withdrawn just above distributing means 35, for example, from a bubble tray or other collecting device 94. It may be recycled through conduit 95, pump 96, and valve 97 to distributing means 41, or it may be passed by a means not shown on the drawings to an acid-recovery unit, such as fractionator 70. The hydrocarbon phase, after a short settling period in space 42 at the top of washer 32, wherein it is separated from the aqueous phase, is withdrawn through outlet 43 having valve 44; if desired, this material may be passed to a fractionator, not shown, to recover isoparaffins for alkylation.

The quantity of water or aqueous dilute hydrofluoric acid introduced is preferably about one-twentieth to one-tenth of the volume of hydrocarbon treated; a much larger proportion introduces excessive amounts of water into the system, whereas a much smaller proportion does not effect substantially complete recovery of hydrofluoric acid from the hydrocarbon. The quantity of concentrated hydrofluoric acid introduced in the central portion of the washer preferably is from one-fourth to two times the volume of hydrocarbon treated, and should be at least five times the volume of aqueous solution introduced at the top of the washer. Smaller amounts do not always completely remove alkyl fluorides from the hydrocarbons or are diluted too much by the aqueous solution from the top of the washer, whereas larger amounts produce an unnecessarily high ratio of acid to hydrocarbon in alkylator 26.

The reaction product from alkylator 26 passes through valve 45 and conduit 46 to separator 47, wherein it is separated into two liquid phases, as by cooling and/or gravitational or centrifugal means.

Of these phases, the lighter or hydrocarbon phase is passed by way of conduit 48 having valve 49 to fractionation unit 50, in which it is separated by fractional distillation into the following six fractions: (1) a very minor fraction of noncondensable gases which is removed through outlet 51 having valve 52; (2) a relatively minor fraction comprising an azeotropic mixture of hydrogen fluoride and light hydrocarbons, such as, propane, butane, and/or pentane, which passes through valve 53 and conduit 54 to separator 55; (3) a comparatively large fraction comprising unreacted alkylatable hydrocarbons, such as isobutane or isopentane, which is recycled via conduit 56 and valve 57 to alkylator 26; (4) a fraction comprising relatively difficult alkylatable hydrocarbons, such as normal butane, which is withdrawn through outlet 58 having valve 59; (5) a substantial fraction of the desired highly branched paraffinic reaction products boiling within the gasoline range, which is withdrawn through outlet 60 having valve 61; and (6) a high-boiling bottom fraction, comprising heavy polymers and other by-products, which is withdrawn through outlet 62 having valve 63.

The heavier or hydrofluoric acid phase from separator 47 may be recycled through conduit 64, valve 65, acid recycle conduit 66 and valve 67 and/or valve 68 to absorber 32 and/or mixer 13, respectively. Preferably, however, at least part of it is passed through valve 69 to acid fractionator 70, in which it is separated by fractional distillation into the following three fractions: (1) a minor low-boiling fraction comprising hydrogen fluoride and low-boiling hydrocarbons, which is passed through valve 71 and conduit 72 to separator 55; (2) a major fraction of substantially pure hydrogen fluoride which is passed through valve 73 to acid recycle conduit 66; (3) a kettle fraction comprising water, hydrofluoric acid, tempering agent, and an organic residue, which is passed through valve 74 and conduit 75 to separator 76.

Separator 55 effects separation of the overhead azeotropes from fractionators 50 and 70 into two liquid phases, as by cooling and gravitational or centrifugal means. The lighter or hydrocarbon phase is withdrawn through outlet 77 having valve 78; the heavier or hydrofluoric acid phase is passed through valve 79 to acid recycle conduit 66.

Into the inhibitor-containing fluid in conduit 75 is injected by means of valve 80 and conduit 81 a selective solvent, preferably water or a dilute aqueous solution containing a suitable chemical reagent, to extract the tempering agent. Water or a dilute aqueous solution of hydrofluoric acid is usually suitable for extracting tempering agents of the basic nitrogen type; alkaline solutions are usually suitable for extracting phenolic or hydroxy organic agents. In separator 76 the resulting mixture from conduit 75 is separated, as by cooling and/or gravitational or centrifugal means, into two liquid phases. The lighter or hydrocarbon phase is withdrawn through outlet 82 having valve 83. The heavier or aqueous phase, containing the tempering agent, may be recycled through valve 84 and conduit 85 to the top section of absorber 32 for use as absorbing fluid therein; preferably, however, a part of it is passed through valve 86 to fractionator 87 which separates it into two fractions. The lower-boiling fraction from fractionator 87 comprises mainly water or other solvent and may be withdrawn through outlet 88 having valve 89; preferably, however, part or all of it is recycled through valve 90 and conduit 91 to conduit 75 for re-use as inhibitor-extracting fluid. The higher-boiling fraction, which comprises substantial proportions of recovered tempering agent or simple chemical derivatives thereof, is recycled through valve 92 and conduit 93 to mixer 13. If desired, the recovered tempering agent may be subjected to further purification steps, not shown in the drawings, before recycling.

The foregoing general flow schemes are preferred arrangements for practicing my invention but should not be taken to limit the invention unduly. Obviously many modifications of the invention are possible, some of which may, at times, be preferable. It should be understood that additional valves, pumps, fractionators, separators, coolers, and the like, such as are well-known to those skilled in the art, may be supplied wherever they are necessary or convenient. The alkylation conditions hereinbefore described are generally suitable for alkylation of readily alkylatable hydrocarbons like isoparaffins and aromatics of the type of benzene or toluene with olefins or with alkyl compounds (alcohols, halides, ethers, esters, etc.) having three or more carbon atoms in the alkyl group; however, when ethylene or an ethyl compound is used, some-what more drastic conditions, such as higher temperatures, may be advantageously employed.

To illustrate further some of the many aspects of my invention, the following examples are given.

EXAMPLE I

In a process similar to that which is embodied in Figure 2, isobutane is alkylated with mixed butylenes from a C₄ refinery gas fraction. Sufficient quinoline is added to the hydrofluoric acid used to absorb olefins to give an acid-to-quinoline ratio of 20 to 1 by weight. The operating conditions are about as follows: temperature in the olefin extractor, 105° F.; pressure in olefin extractor, 150 pounds per square inch; time of contact of olefins with hydrofluoric acid prior to the alkylation step, 6 minutes; alkylator temperature, 125° F.; alkylator pressure, 125 pounds per square inch; reaction time, 5 minutes; hydrogen fluoride-to-olefin ratio, 10:1; isobutane-to-olefin ratio 3.5:1. Under these conditions is produced an aviation-gasoline product in high yield and of good quality.

EXAMPLE II

To a mixture of 301.2 grams of substantially pure anhydrous hydrofluoric acid, 20 cc. of methanol, and 126 grams of isobutane, agitated at room temperature in a closed container, were slowly added 44.5 grams of butene-1. After a few minutes the mixture was withdrawn and allowed to settle. About 70 cc. of saturated, normally liquid hydrocarbon material having at 68° F. a specific gravity of 0.7277 and a refractive index of 1.4066 was obtained.

EXAMPLES III, IV, AND V

Three batch runs, hereinafter referred to as Examples III, IV, and V, were made for alkylating isobutane with butene-1 under similar conditions except for the composition of the catalyst. In Example III, the catalyst consisted of anhydrous hydrofluoric acid modified by 5.6 weight per cent of methyl alcohol; in Example IV, it consisted of anhydrous hydrofluoric acid modified by 8.0 weight per cent of glacial acetic acid; and in Example V, it consisted of unmodified anhydrous hydrofluoric acid. An 18-liter steel reactor provided with a motor driven 540-R. P. M. stirrer was used in each run. The catalyst and the isobutane were mixed together, and the butene-1 was then added at a uniform rate. After the butene-1 had been added, the stirring was continued for a short additional period; the average contact time of the hydrocarbon reaction mixture with the acid was about the same for all three runs. The mixture was allowed to separate into two layers, and the hydrocarbon layer was removed, acid-freed, debutanized, and examined.

Experimental data for these three examples are given in Table I. It will be noted that the proportion of octanes in the total alkylate was higher in Example III than in Example V; that the yield of the aviation-gasoline fractions based on total debutanized alkylate was higher in Examples III and IV than in Example V; that the octane numbers of the aviation-gasoline fractions produced in Examples III and IV were markedly higher than in Example V; that the lead susceptibility of the aviation-gasoline fraction from Example III was slightly higher than that from Example V; and that these favorably different octane-rating effects were obtained in spite of higher cut points used for obtaining the aviation-gasoline fractions in Examples III and IV.

TABLE I

*HF alkylation of isobutane with butene-1*

| | Example | | |
|---|---|---|---|
| | III | IV | V |
| Catalyst modifier | Methanol | Acetic Acid | None |
| Temperature, °F | 100–117 | 97–113 | 99–113 |
| Pressure, p. s. i | 78–99 | 82–100 | 93–111 |
| Contact time, min.: | | | |
|   Olefin addition | 26 | 15 | 17 |
|   Further agitation | 3 | 7 | 6 |
|   Average | 16 | 14.5 | 14.5 |
| Isobutane/butene ratio (wt.) | 12.50 | 11.92 | 12.85 |
| Total hydrocarbon/HF ratio (wt.) | 2.16 | 2.21 | 2.27 |
| Composition, volume per cent: | | | |
|   Pentanes | 0.0 | | 0.0 |
|   Hexanes | 2.2 | | 2.9 |
|   Heptanes | 4.4 | | 3.2 |
|   Octanes | 86.2 | | 83.5 |
|   Nonanes | 0.7 | | |
|   Decanes | 0.7 | | |
|   Undecanes | 3.1 | | 7.3 |
|   Dodecanes | | | |
|   Heavier | 2.7 | | 3.1 |
|   Total | 100.0 | | 100.0 |
| Aviation-gasoline fraction: | | | |
|   Cut point, °F | 365 | 367 | 356 |
|   Volume per cent of total alkylate | 95.5 | 97.2 | 91.4 |
|   ASTM distillation, °F.: | | | |
|     First drop | 178 | 128 | 192 |
|     10 per cent evaporated | 208 | 184 | 212 |
|     50 per cent evaporated | 218 | 221 | 221 |
|     90 per cent evaporated | 229 | 234 | 229 |
|     End point | 348 | 364 | 309 |
| Octane number (ASTM): | | | |
|   0 cc. TEL | 93.3 | 92.5 | 89.2 |
|   1 cc. TEL | 102.2 | | 97.8 |

Because the invention may be practiced otherwise than as specifically described herein, and because many modifications and variations of it will be obvious to those skilled in the art, it should not be restricted except as specified in the appended claims.

I claim:

1. A process for alkylating relatively low-boiling alkylatable hydrocarbons with relatively low-boiling olefins to produce higher boiling hydrocarbons in the presence of concentrated hydrofluoric acid as a catalyst, which comprises admixing with said hydrofluoric acid a minor proportion of a polar organic compound soluble in hydrofluoric acid which is one of the group consisting of organic hydroxy compounds and organic nitrogen compounds having a basic reaction as a tempering agent, contacting the resultant mixture with a hydrocarbon mixture containing olefins and saturated hydrocarbons whereby the olefins are absorbed by the hydrogen fluoride, separating the olefin-free saturated hydrocarbons therefrom, introducing the olefin-hydrogen fluoride mixture together with the tempering agent into an alkylation zone along with alkylatable hydrocarbons, introducing said olefin-free saturated hydrocarbons into an absorber in contact with concentrated hydrofluoric acid for the removal of organic fluorides formed from the olefin absorption from said hydrocarbons and recovering said hydrocarbons, introducing the hydrofluoric acid used for contacting said hydrocarbons into the alkylation zone as a portion of the catalyst for the alkylation reaction, removing the reaction products from the alkylation zone and separating therefrom a light hydrocarbon phase and a heavier hydrofluoric acid phase, recovering from said hydrocarbon phase a fraction essentially comprising hydrocarbon reaction products, fractionating at least a portion of said heavier phase to recover as an overhead fraction substantially pure hydrogen fluoride and a bottom fraction comprising said tempering agent along with hydrofluoric acid and undesired impurities, contacting said bottom fraction with a selective solvent for said tempering agent, subsequently recovering said tempering agent from said selective solvent, and re-introducing said tempering agent into additional hydrofluoric acid charged to the process.

2. A process for alkylating a low-boiling alkylatable hydrocarbon with an olefin to produce higher boiling hydrocarbons in the presence of a concentrated hydrofluoric acid alkylating catalyst, which comprises adding to liquid concentrated hydrofluoric acid between about 0.1 to 10 per cent by weight of methyl alcohol as a tempering agent, contacting said tempered liquid hydrofluoric acid with a low-boiling olefin-containing mixture in a contacting zone to absorb olefins in said hydrofluoric acid, separating a resulting olefin-depleted hydrocarbon mixture from a resulting olefin-rich hydrofluoric acid, passing said olefin-rich acid to an alkylation zone and reacting olefins contained therein with a low-boiling alkylatable hydrocarbon in the presence of said hydrofluoric acid as an alkylating catalyst, passing effluents of said alkylation zone to separating means and separating a hydrocarbon phase from a liquid hydrofluoric acid phase, recovering hydrocarbon reaction products from said hydrocarbon phase as products of the process, passing a portion of said acid phase to said contacting zone, subjecting a further portion of said acid phase to fractional distillation to separate relatively pure hydrofluoric acid as a low-boiling fraction from a high-boiling fraction comprising methyl alcohol and undesired impurities, returning said hydrofluoric acid to said contacting zone, washing said high-boiling fraction with water to separate methyl alcohol from said impurities, recovering said methyl alcohol from the resulting aqueous solution and returning same to said contacting zone.

3. An improved process for alkylating hydrocarbons, which comprises reacting under alkylation conditions a low-boiling alkylatable hydrocarbon with an olefin in the presence of liquid concentrated hydrofluoric acid associated with between about 0.1 and 10 per cent by weight of methyl alcohol.

4. In a process for converting relatively low-boiling hydrocarbons to relatively higher-boiling hydrocarbons, by alkylation in the presence of concentrated hydrofluoric acid as a catalyst, the improvement which comprises adding methyl alcohol to said hydrofluoric acid as a tempering agent.

5. The process of claim 1 in which said tempering agent is a primary monoalcohol.

6. The process of claim 1 in which said tempering agent is methyl alcohol.

7. The process of claim 1 in which said tempering agent is ethanol.

8. A process for alkylating a relatively low-boiling alkylatable hydrocarbon with a low-boiling olefin to produce higher-boiling hydrocarbons in the presence of concentrated hydrofluoric acid as a catalyst, which comprises admixing with liquid hydrofluoric acid between about 0.1 to 10 per cent by weight of a polar organic compound soluble in hydrofluoric acid which is one of the group consisting of organic hydroxy compounds and organic nitrogen compounds having a basic reaction as a tempering agent, contacting the resultant liquid mixture with a hydrocarbon mixture containing a low-boiling olefin and saturated hydrocarbons to absorb said low-boiling olefin, introducing resulting liquid olefin-containing hydrofluoric acid containing said tempering agent into an alkylation zone along with a low-boiling alkylatable hydrocarbon, maintaining the contents of said alkylation zone under alkylation conditions, and recovering from effluents of said alkylation zone a hydrocarbon fraction containing a higher-boiling hydrocarbon produced by said alkylation.

9. An improved process for alkylating hydrocarbons, which comprises reacting under alkylation conditions a low-boiling alkylatable hydrocarbon with an olefin in the presence of liquid concentrated hydrofluoric acid associated with between about 0.1 and 10 per cent by weight of a primary monohydric alcohol.

10. The process of claim 9 in which said alcohol is ethanol.

11. The process of claim 8 in which said tempering agent is a primary monoalcohol.

12. The process of claim 8 in which said tempering agent is methyl alcohol.

13. The process of claim 8 in which said tempering agent is ethanol.

FREDERICK E. FREY.